US006266789B1

(12) United States Patent
Bucher et al.

(10) Patent No.: US 6,266,789 B1
(45) Date of Patent: Jul. 24, 2001

(54) DEEP TRACE MEMORY SYSTEM FOR A PROTOCOL ANALYZER

(75) Inventors: Steven Bucher, Minnetonka; Daniel G. Kuechle, Ramsey; Timothy A. Wall, Big Lake, all of MN (US)

(73) Assignee: I-Tech Corporation, Eden Prairie, MN (US)

( * ) Notice: Subject to any disclaimer, the term of this patent is extended or adjusted under 35 U.S.C. 154(b) by 0 days.

(21) Appl. No.: 09/193,779

(22) Filed: Nov. 17, 1998

Related U.S. Application Data

(60) Provisional application No. 60/065,782, filed on Nov. 17, 1997.

(51) Int. Cl.[7] .................................................. G06F 11/25
(52) U.S. Cl. ................................. 714/39; 714/45; 707/6
(58) Field of Search ................................. 714/39, 45, 46, 714/37, 43; 707/3, 6

(56) References Cited

U.S. PATENT DOCUMENTS

| | | | |
|---|---|---|---|
| D. 360,150 | * 7/1995 | Glitzke | D10/75 |
| 4,949,252 | 8/1990 | Hauge | 364/200 |
| 5,247,517 | 9/1993 | Ross et al. | 370/85.5 |
| 5,274,648 | 12/1993 | Eikill et al. | 371/21.2 |
| 5,276,529 | * 1/1994 | Williams | 358/406 |
| 5,315,580 | 5/1994 | Phaal | 370/13 |
| 5,406,566 | 4/1995 | Obara | 371/21.2 |
| 5,442,639 | 8/1995 | Crowder et al. | 371/20.1 |
| 5,526,283 | 6/1996 | Hershey et al. | 361/514 C |
| 5,548,719 | * 8/1996 | DeVane et al. | 714/39 |
| 5,648,965 | 7/1997 | Thadani et al. | 370/241 |
| 5,671,376 | * 9/1997 | Bucher et al. | 395/309 |
| 5,761,424 | 6/1998 | Adams et al. | 395/200.47 |
| 5,850,386 | * 12/1998 | Anderson et al. | 370/241 |
| 6,018,809 | * 1/2000 | Garrett | 714/37 |
| 6,055,651 | * 4/2000 | Sasaki et al. | 714/45 |
| 6,122,757 | * 9/2000 | Kelley | 714/39 |

OTHER PUBLICATIONS

Xyratex Press Release, "Xyratex shows Fibre Channel Protocol Analyzer Plus (PA+) At IBC", Sep. 11, 1998 3 pages.
Xyratex Press Release, "New Fibre Channel Protocol Analyzer", Oct. 17, 1997, 3 pages.
Xyratex Web Site, "Fibre Channel Test and Development System", 1998, 3 pages.
Ancot Web Site, "Introducing the FCA–5010 Fibre Channel Analyer", undated, 2 pages.
Finisar Press Release, "Analyzer multiple points in Fiber Channel network with new multiport protol analyzer", Sep. 16, 1998, 2 pages.
Finisar Web Site, "Fibre Channel Gigabit Traffic System", undated, 2 pages.
Finisar Web Site, "GLA 3100 Gigabit Link Analyzer", undated, 3 pages.
I–TECH Product Flyer, "IPC–2000 Portable Test System— PassPort Portable Test Chassis", undated, 2 pages.

(List continued on next page.)

*Primary Examiner*—Robert Beausoleil
*Assistant Examiner*—Scott Baderman
(74) *Attorney, Agent, or Firm*—Patterson, Thuente, Skaar & Christensen, P.A.

(57) ABSTRACT

A deep trace buffer management system for a protocol analyzer includes a hardware search engine that locates specified data patterns within the trace buffer as directed by a host processor. The protocol analyzer is preferably connected to a laptop computer that serves as the host processor, and the protocol analyzer preferably is housed in a portable chassis separate from the host processor and has a host port to connect to the host processor through a relatively small bandwidth port. An interface port connects the protocol analyzer to the communication interface under analysis. Logic circuitry controls selective read and write operations of traces to and from the trace buffer in response to parameters as directed by the host processor.

21 Claims, 8 Drawing Sheets

OTHER PUBLICATIONS

I–TECH Product Flyer, "IPC–8580 Ultra2 SCSI Analyzer", 11/97, 4 pages.

I–TECH Product Flyer, "IFC–20 Fibre Channel Analyzer", 11/97, 4 pages.

I–TECH Web Site, "Fact Sheet IFC–20 Fibre Channel Analyzer", 11/97, 3 pages.

Clariion Web Site, "Clariion Service Powertools", 8/98, 5 pages.

FuturePlus Web Site, "Fibre Channel Bus Analysis Probe Preliminary Information", 4/98 3 pages.

* cited by examiner

DEEP TRACE MEMORY SYSTEM FOR A PROTOCOL ANALYZER

This application claims benefit to Provisional Application 60/065,782 filed Nov. 17, 1997.

FIELD OF THE INVENTION

The present invention relates generally to the field of diagnostic equipment, testers and analyzers for use with communication interfaces among computing devices. More specifically, the present invention relates to the management of large amounts of trace memory for protocol analyzers, and particularly in relation to the use of a hardware search engine in a protocol analyzer having a deep trace memory that is connected to a separate host processor.

BACKGROUND OF THE INVENTION

Protocol analyzers are used as diagnostic and testing tools at various stages of the development, integration and maintenance of electronic computing devices. Typically, a protocol analyzer is designed for use with a particular electrical communication interface protocol, such as ATA, SCSI, Ethernet or Fibre Channel. In a typical use, the protocol analyzer is connected to the communication interface of the computing system being tested to record communication activity on the interface. The communication activity is captured and recorded in a dedicated trace buffer associated with the protocol analyzer, and then analyzed and/or presented to the user for the purpose of diagnosing, testing or maintaining the communication interface.

It will be apparent that the size of the trace buffer necessarily limits the amount of communication activity that can be recorded by the protocol analyzer. As the transfer speeds of communication interfaces among computing systems have increased, the need for larger or deeper trace buffers has also increased. In the early days of modern communication interfaces, trace buffers were relatively small (1K buffer) and were implemented as cache memories directly connected to a processor within the protocol analyzer, as shown, for example, in U.S. Pat. No. 4,949,252. When faster communication interfaces were developed, such as the Ethernet protocol, the size of the trace buffer increased (65K buffer) and filtering techniques were applied to minimize the amount of trace data which needed to be captured, as shown, for example, in U.S. Pat. No. 5,442,639.

While smaller size trace buffers were adequate to record communication activity for several minutes on moderate speed communication interfaces, such as the ATA or SCSI protocols, larger trace buffer depths are necessary to record communication activity for the same period of time on faster communication interfaces such as the Fibre Channel protocol. Examples of buffer sizes in existing Fibre Channel protocol analyzers include the Xyratex TP-5-100-PA+ Fibre Channel Protocol Analyzer Plus (3 MB to 24 MB), the Ancot FCA-5010 Fibre Channel Analyzer (524,000 event trace memory), and the Finisar GT-A Fibre Channel Protocol Analyzer (4 MB to 256 MB).

Managing the large amount of data generated by faster communication interfaces is difficult. Most of the faster communication interfaces today operate using packet data transfers in which packets of data, each with an associated header, are communicated among devices on the interface. One of the ways that the large amounts of data are managed in a packet data transfer system is to tightly integrate the communication buffer that receives the data packets from the communication interface with the processor. The communication buffer and the processor are typically interconnected by a common bus having a relatively large bandwidth in order to allow operations to be performed by the processor on the data packets within the communication buffer at the speeds that are required to keep up with the data transfer rate of the communication interface.

Different techniques have been proposed for improving the operational efficiency of buffers for packet data transfer communication interfaces in terms of the way in which the memory of the communication buffer is managed. One approach is to apply a filtering technique in order to reduce the amount of data that must be recorded to only those packets of data that are particularly of interest. Examples of various filtering techniques for packet data communication buffer management are shown in U.S. Pat. Nos. 5,648,965 and 5,761,424. Another technique is to capture only the header information associated with each data packet as shown, for example, in U.S. Pat. No. 5,526,283. Alternatively, it has been proposed to randomly select packets to be analyzed to minimize processor and buffer capacity requirements as shown, for example, in U.S. Pat. No. 5,315,580. The use of a serial state machine separate from the communication processor has also been proposed to handle communication packet processing as shown, for example, in U.S. Pat. No. 5,247,517.

Unfortunately, many of the techniques used in conventional data packet communication buffer management are not applicable to trace buffer management in a protocol analyzer because the trace buffer must be able to capture and retain significant volumes of data packets for purposes of subsequent analysis of an entire segment of a transfer; whereas communication buffers only temporarily hold data packets until they have been processed in a serial fashion by the device to which they have been sent.

In each of the existing Fibre Channel protocol analyzers, the trace buffer memory is physically located within the same chassis as the processor which operates the protocol analyzer, and, like conventional communication buffers, is connected to the processor by a relatively large bandwidth bus-like data transfer path. Having the trace memory physically contiguous with the processor allows for the processor in the protocol analyzer to have relatively efficient access to these large trace memories. Unfortunately, this requires that these devices be implemented using bus-interface connections on a standard PC board that are connected either as part of a desktop or tower personal computer configuration, or as part of a special purpose portable computer (a non-laptop device typically weighing more than 10 pounds and often referred to as a luggable computer).

In addition, most of the existing Fibre Channel protocol analyzers have utilized static random access memory (SRAM) to implement a deep trace buffer memory because of the speed and ease of memory management of such SRAM. SRAM has several disadvantages, however. First, it has a relatively high power consumption that can require larger, heavier and more expensive power supplies to support larger and deeper trace memories. Second, a trace buffer memory implemented in SRAM will be relatively larger than the same size trace buffer implemented in dynamic random access memory (DRAM). Unfortunately, some types of DRAM are more difficult to use in the context of a high speed trace buffer memory due to the potential conflict between the periodic refresh cycle of the DRAM and the need to write into the DRAM at a high bandwidth in order to capture traces from a high-speed communication interface, such as the Fibre Channel interface.

Another challenge faced by existing Fibre Channel protocol analyzers relates to the ability to search through a trace in the trace buffer memory looking for a particular data pattern. Protocol analyzers typically provide a search feature in which the trace buffer is scanned to look for a pattern defined by the user. In the prior art, this function is performed by the processor of the protocol analyzer, which for a PC-based analyzer would be the computer processor. To accomplish this, the computer processor must download the data from the trace buffer into the main memory of the computer processor, and a software routine is used to search for the specified data pattern in the main memory of the host processor. There are two disadvantages to this technique. First, it requires at least a partial download of the trace buffer into the main memory of the computer processor. This download can take a significant amount of time, depending upon the bandwidth of the connection between the trace buffer and the main memory of the computer processor. Second, the speed of the search is necessarily limited to the speed of the software algorithm as executed by the computer processor. Although it is known to incorporate test hardware circuitry into memory chips for the purpose of verifying the proper operation of those chips, as shown for example, in U.S. Pat. Nos. 5,247,648 and 5,406,566, such test circuitry has not been used in place of a software search routine to locate a particular data pattern that may or may not be present in a trace buffer.

Protocol analyzers have other potential design considerations that impact the manner in which trace buffers are preferably managed. One of the chief design considerations is the portability of the protocol analyzer. One approach to providing a highly flexible and extremely portable protocol analyzer is represented by the PassPort™ portable test chassis SCSI protocol analyzer offered by I-Tech Corp., the assignee of the present invention. Conventional SCSI protocol analyzers have been either desktop or tower PC-hosted devices that are not portable, or specially designed portable pieces of equipment that offer far less functionality and adaptability than a PC-hosted device. In contrast, the PassPort™ chassis contains a specialized motherboard in a relatively small case weighing less than 3 pounds that connects to a laptop PC via a parallel port cable and provides all of the capabilities of PC-hosted devices, without the need for specially designed portable pieces of test equipment.

Although portability is a desirable design objective for a protocol analyzer, this advantage has been achieved to date only by decoupling the processor from the trace buffer and imposing a relatively low bandwidth interface between the two. In the context of the requirements of managing a deep trace buffer memory for a high speed packet data communication interface, however, this approach would only aggravate the difficulties in managing the massive amounts of data that a Fibre Channel trace buffer, for example, must store and manage.

While existing Fibre Channel protocol analyzers are able to provide the deep trace buffers required for capturing and diagnosing packet data transfers on these high speed communication interfaces, it would be desirable to provide a Fibre Channel protocol analyzer that was more convenient and portable, and that was not necessarily constrained by the need to have the deep trace memory located contiguous with the host processor for the protocol analyzer. It would also be desirable to provide a deep trace buffer that could overcome the disadvantages of utilizing large memory transfers to the main memory of the host processor and software search algorithms to locate data patterns in the trace buffer.

SUMMARY OF THE INVENTION

The present invention is a deep trace buffer management system for a protocol analyzer. The protocol analyzer is preferably connected to a laptop computer equipped with the software that implements a host processor. The protocol analyzer preferably is housed in a portable chassis separate from the host processor and has a host port to connect to the host processor through a relatively small bandwidth port. An interface port connects the protocol analyzer to the communication interface under analysis. Logic circuitry controls selective write operations of traces from the interface port to a trace buffer and selective read operations of traces from the trace buffer to the host port in response to parameters as directed by the host processor. A hardware search engine in the protocol analyzer locates specified data patterns within the trace buffer as directed by the host processor without the need to download data from the trace buffer to the main memory of the host processor.

The preferred embodiment of the present invention is configured for a Fibre Channel interface having a serial transfer rate of at least 1 gigabit/second. The trace buffer is preferably divided into dual channels, one channel that stores traces from a first channel connection, and another channel that stores traces from a second channel connection. In the preferred embodiment, the host port is a PC parallel port and the interface port provides a pair of channel connections to the interface. In an alternate embodiment, the host processor is more closely connected with the protocol analyzer by an internal bus and the protocol analyzer uses the hardware search engine instead of the main memory in the host processor to improve the search performance of the system. In one embodiment, the trace buffer comprises at least two interleaved banks of memory formed of at least two megabytes of dynamic random access memory (DRAM) chips. The traces are stored in each bank of the trace buffer on alternating clock cycles to enable a sufficient bandwidth between the trace buffer and the channel connection to support the high data transfer speeds associated with the Fibre Channel interface. Alternating clock cycles between the two banks of DRAM chips also enables the DRAM chips to be refreshed on the opposite alternating clock cycles. In another embodiment, the trace buffer comprises a single bank of fast DRAM chips for each channel connection where the fast DRAM chips have a bandwidth sufficient to support the high data transfer speeds associated with the Fibre Channel interface.

The advantages of the present invention are that the hardware search engine can search the entire contents of the trace buffer for a specified data pattern in less than 10 seconds, and preferably in less than 3 seconds for a fully configured trace buffer of 256 Mbytes. The hardware search engine is configured to conduct a search of the trace buffer at a search rate of greater than 1 Mbyte every 20 milliseconds. This search rate is significantly faster than even most DMA transfers by which data could be transferred from the trace buffer to the main memory of the host processor, let alone accomplish a software search of the transferred data in the main memory. By separating the protocol analyzer from the host processor, the preferred embodiment of the present invention allows the host processor to be implemented using a conventional laptop PC and the protocol analyzer can be truly portable, having a chassis that is less than 750 cubic inches and weighs less than 10 pounds.

DESCRIPTION OF THE PREFERRED EMBODIMENT

Figure 8:
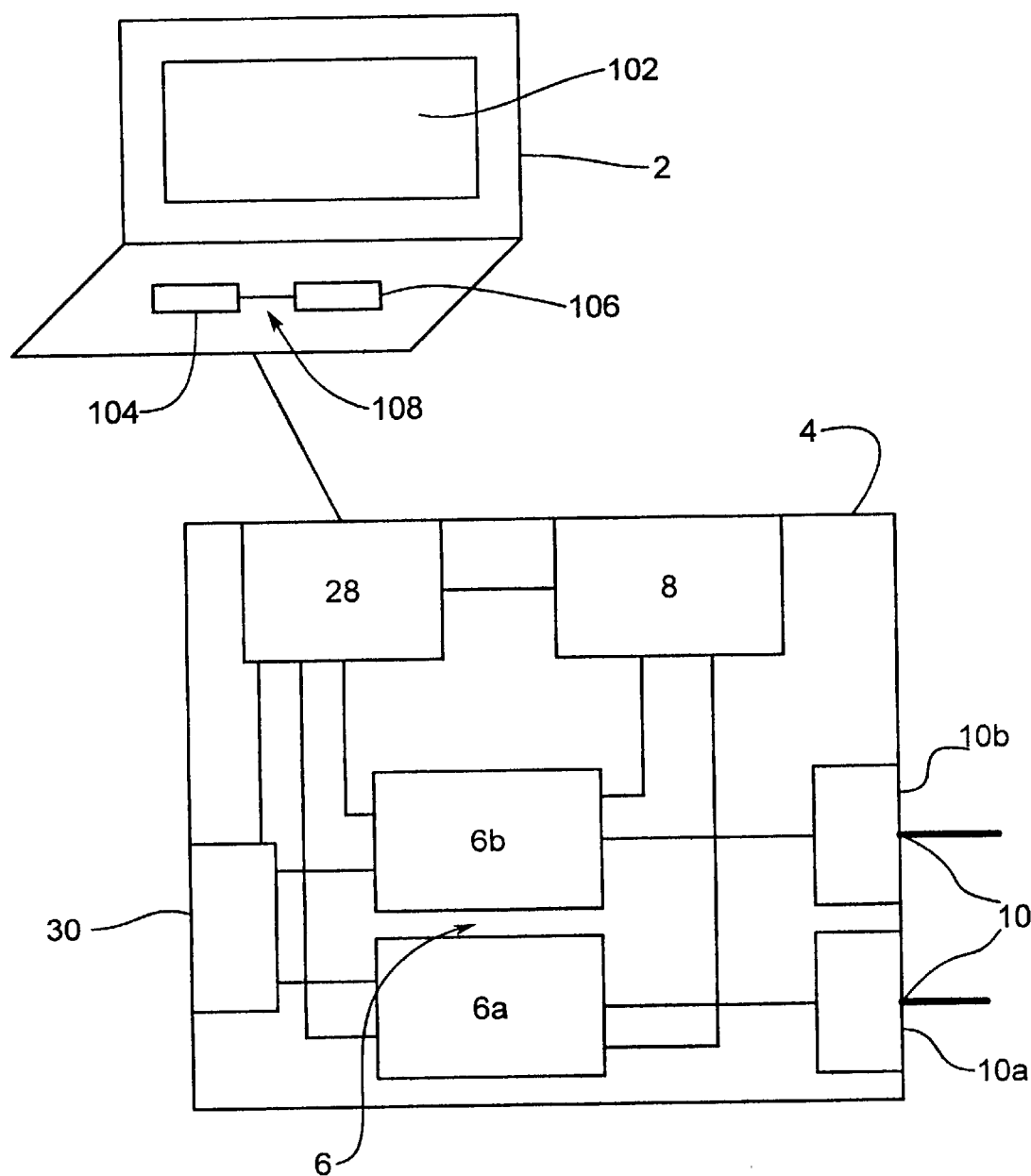
FIG. 8 is a simplified block diagram of the deep trace buffer memory management system of the present invention.

As shown generally in FIG. 8, a system for analyzing a communication interface comprises host processor 2 and a protocol analyzer 4. For conceptual clarity, not all of the detailed elements implementing the preferred embodiment are shown. Preferably, the host processor 2 is a laptop computer provided with software to implement the operation of the host processor on the laptop computer. Alternatively, the host processor could be implemented in a non-portable computer if the protocol analyzer is intended to be a permanent monitoring fixture for the given communication interface. As with any PC-based computer known in the art, the host processor 2 includes at a minimum a user interface 102, a computer processor 104 and a main memory 106 that are interconnected with each other by a conventional bus interface 108. Preferably, the protocol analyzer 4 is housed in a portable chassis separate from the host processor 2. In this embodiment, the protocol analyzer 4 has a host port 28 that provides a relatively low speed interface to the host processor having a smaller bandwidth connection, and an interface port 10 that provides a connection between a deep trace buffer memory 6 and the communication interface. In an alternate embodiment, the protocol analyzer and the host processor are housed in the same chassis and the host port 28 may provide a relatively faster connection, such as an internal bus connection in the form of a PCI bus or an ISA bus. In this embodiment, the bus interface 28 between the protocol analyzer 4 and the host processor 2 is separate from the interface between the trace buffer 6 and a hardware search engine 30 of the protocol analyzer 4 and is also separate from the bus interface 108 between computer processor 104 and the main memory 106 of the host processor 2.

Figure 1:
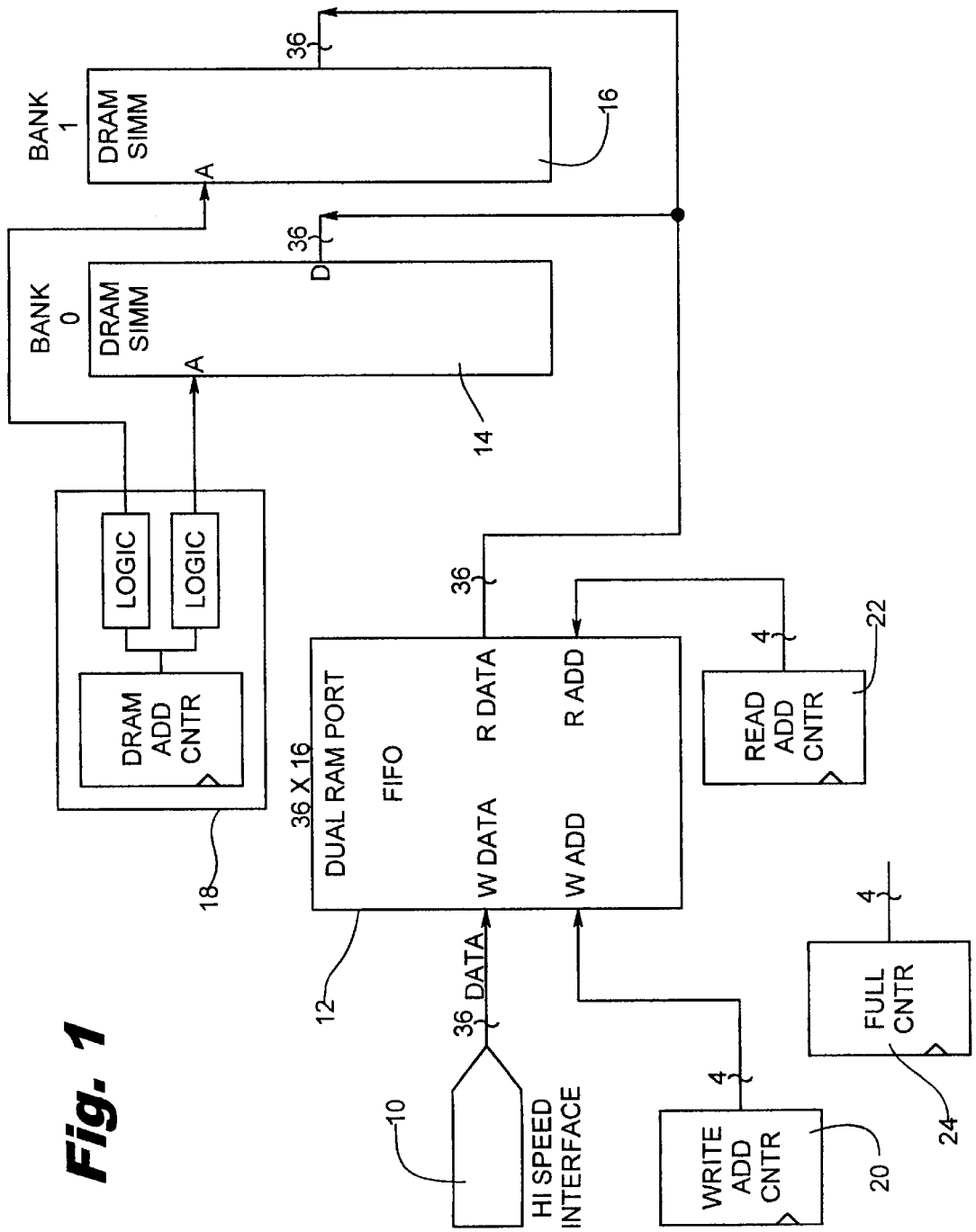
FIG. 1 is a high level system block diagram showing pertinent data storage hardware and process.
Figure 2:
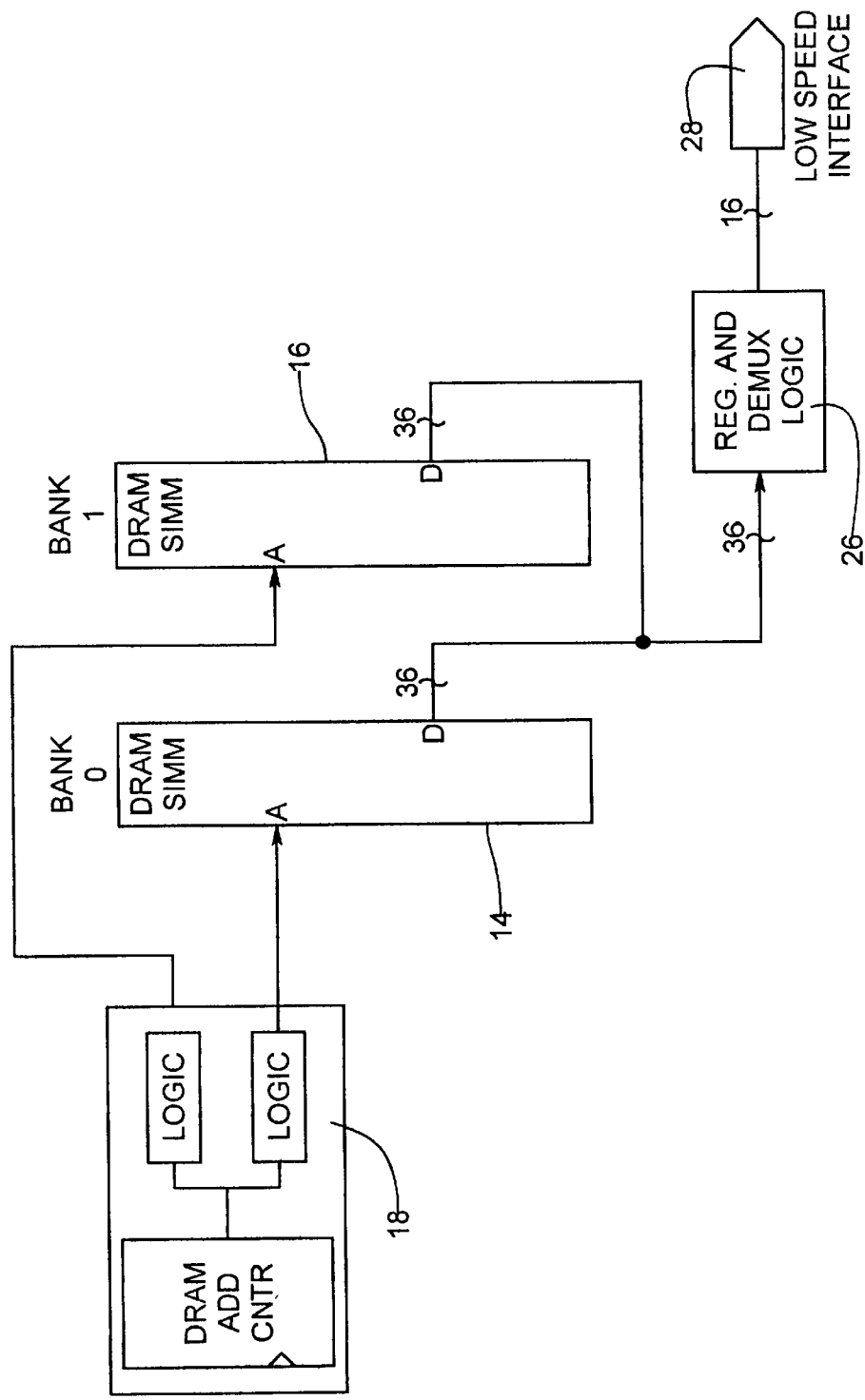
FIG. 2 is another high level system block diagram showing pertinent data transfer hardware and process.

As shown in more detail in FIGS. 1 and 2, the interface port 10 in one embodiment preferably includes a dual port fifo buffer 12 and the deep trace buffer memory 6 is preferably comprised of a pair of fast page DRAM banks of memory 14, 16 that require refresh control. In another embodiment, interface port 10 may include a dual port fifo buffer 12 and a single synchronous DRAM bank of memory 14. It will be understood that the detailed description of the first embodiment with reference to FIGS. 1 and 2 with a dual port fifo 12 and a pair of DRAM banks 14, 16 is described in terms of a 36 bit wide data path, the second embodiment having a dual port fifo buffer and a single bank of DRAM is preferably implemented in terms of a 40 bit wide data path to more easily format the trace capture of the Fibre Channel interface, although the data path could be any width desired.

Logic circuitry 8 controls selective write operations of traces from the interface port 10 to the trace buffer 6 and selective read operations of traces from the trace buffer 6 to the host port 28 in response to parameters as directed by a user through the host processor 2. As described hereinafter in further detail, the protocol analyzer 4 includes a hardware search engine 30 that locates specified data patterns within the trace buffer 6 as directed by the user through the host processor 4.

The communication interface for which the protocol analyzer 4 of the present invention is preferably designed is a Fibre Channel interface having a serial transfer rate of packet data of at least 1 gigabit/second, although the present invention would work equally as well with other communication interfaces previously discussed. In this embodiment, the low speed interface 28 that serves as the host port is a PC parallel port. This provides a convenient and standard connection to the laptop computer that serves as the host processor 2. Alternatively, other relatively low speed, smaller bandwidth ports such as a serial interface or Ethernet connection, for example, could serve as the host port in the embodiment in which the protocol analyzer 4 is physically separated from the host processor 2.

In the preferred embodiment of a Fibre Channel interface as shown in FIG. 8, the interface port 10 provides a pair of channel connections (10a, 10b) to the communication interface and the trace buffer is divided into dual channels, one channel 6a that stores traces from a first channel connection 10a and another channel 6b that stores traces from a second channel connection 10b. The pair of channel connections 10a, 10b are provided because the Fibre Channel interface typically provides for a pair of connections comprising an inbound connection and an outbound connection. To monitor both of these connections, it is preferred that the protocol analyzer also be equipped with a pair of channel connections 10a, 10b. It should be noted that the description of the preferred embodiment with respect to FIGS. 1 and 2 sets forth the detailed implementation of a deep memory trace buffer for a single channel. To accomplish the dual channel mode described above, the trace buffer for a single channel would be replicated, one for each channel connection.

Now turning to the drawings and more particularly FIG. 1 thereof, it will be observed that it depicts the principal components of the data storage hardware and process in accordance with one embodiment of the principle of the invention. Depicted there are high speed interface 10 which is interconnected, via conventional data communication paths as shown, with preferably dual port memory 12 configured as a first-in-first out (fifo). Also included are conventional data communication between dual port memory 12 and DRAM bank 14 and DRAM bank 16. Further, address counter 18 is in data communication with DRAM bank 14 and DRAM bank 16. Hardware 18 controls write address counter 20 read address counter 22 and address full counter 24, which allow dual port memory 12 to act as a fifo. These counters may be of the type normally available with current state of the art READ/WRITE address counters.

Now turning to FIG. 2, it will be observed that it depicts address counter 18 and its interconnection with DRAM bank 14 and DRAM bank 16 as shown in FIG. 1. Register/demultiplexor 26 is in data communication with DRAM bank 14 and DRAM bank 16. Data transferred from the DRAM banks is preferably stored in 36 bit register and multiplexed on to low speed interface 28 thereby enabling data transfer. Although all of these features are not required to implement data transfer as contemplated by the principles of the present invention and thus some of them are optional, it is deemed apparent that each of the features illustrated add to the usefulness and modular implementation of deep memory option.

Figure 3:
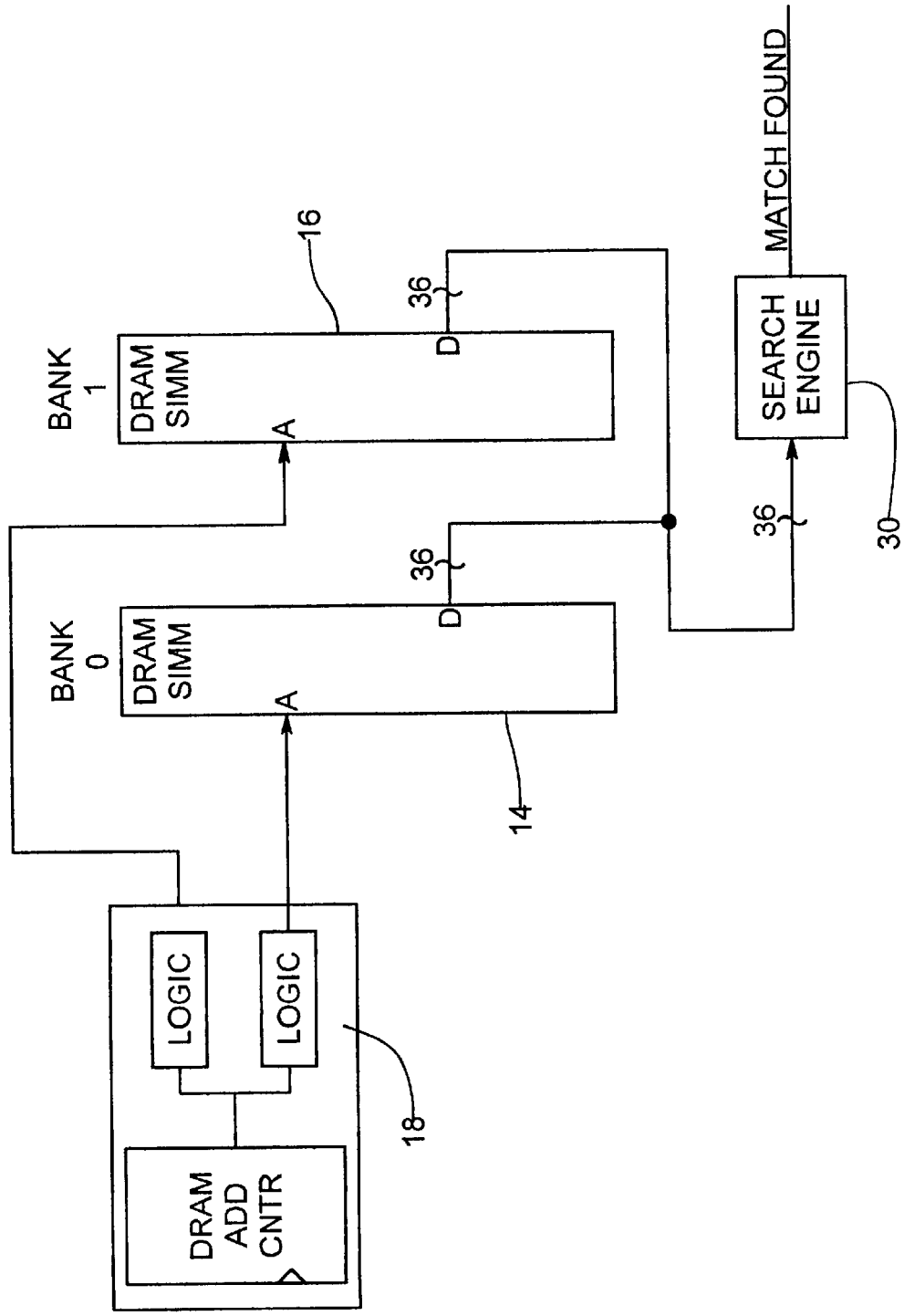
FIG. 3 is yet another high level system block diagram showing pertinent search hardware and associated process.

Now turning to FIG. 3, it will be observed that it illustrates practice of the principles hereof in cooperation with and implementation of search engine 30. Thus, according to FIG. 3, the data storage component and process of FIG. 1 interconnects with search engine 30 via conventional data communication channel to perform a search for data matching the desired data pattern. For illustrative purposes, the output of search engine 30 is shown as a match found flag.

Figure 4:
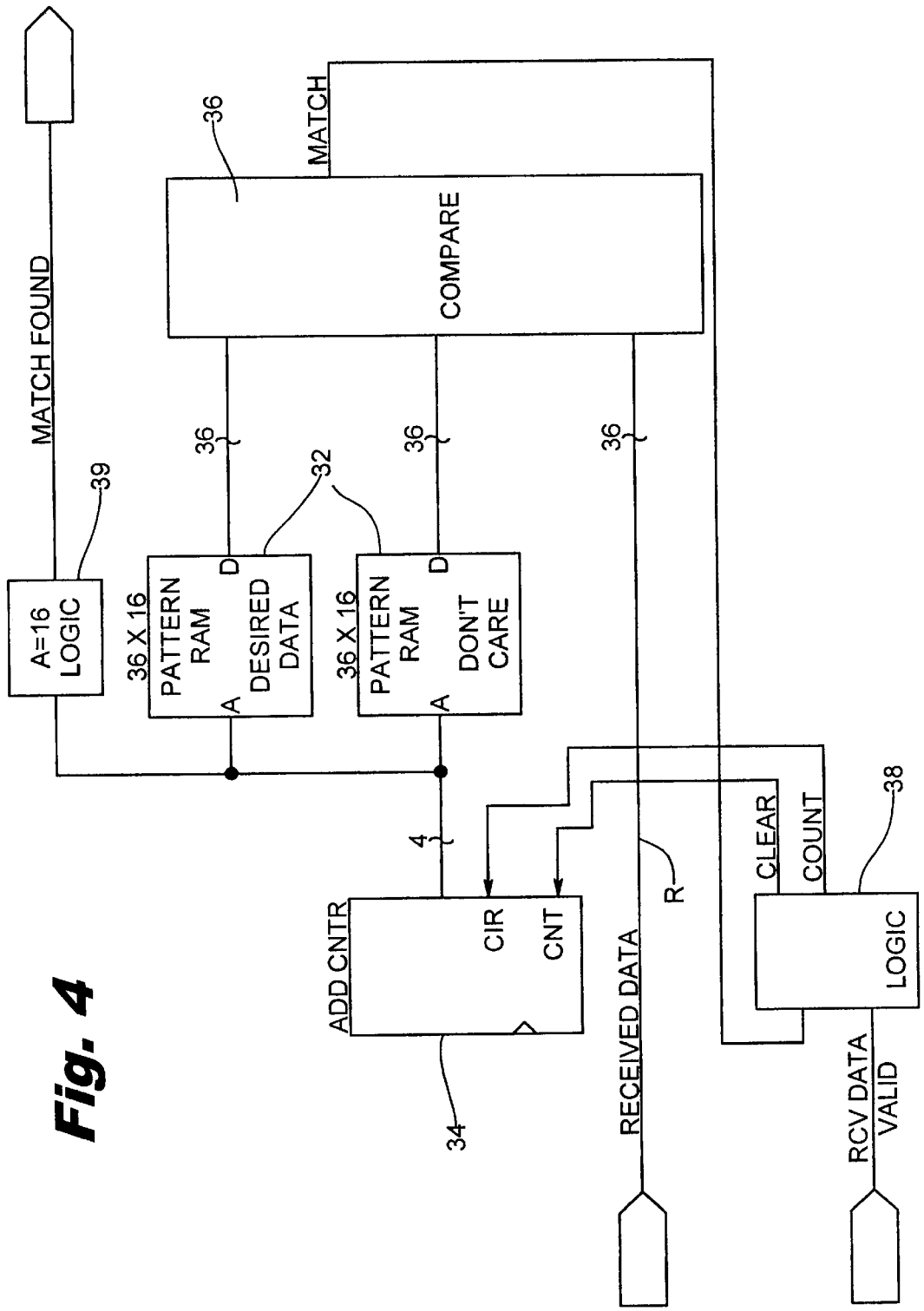
FIG. 4 is a high level block diagram of the hardware for the search engine of the present invention.

Now turning to FIG. 4, the principal components of search engine 30 are shown. Search engine 30 includes two blocks of pattern RAM 32, a 4 bit counter 34 and a comparator 36. Received data R from DRAM bank 14 and DRAM bank 16 is directed to comparator 36. Likewise data from Pattern RAM 32 is communicated to comparator 36.

Figure 5:
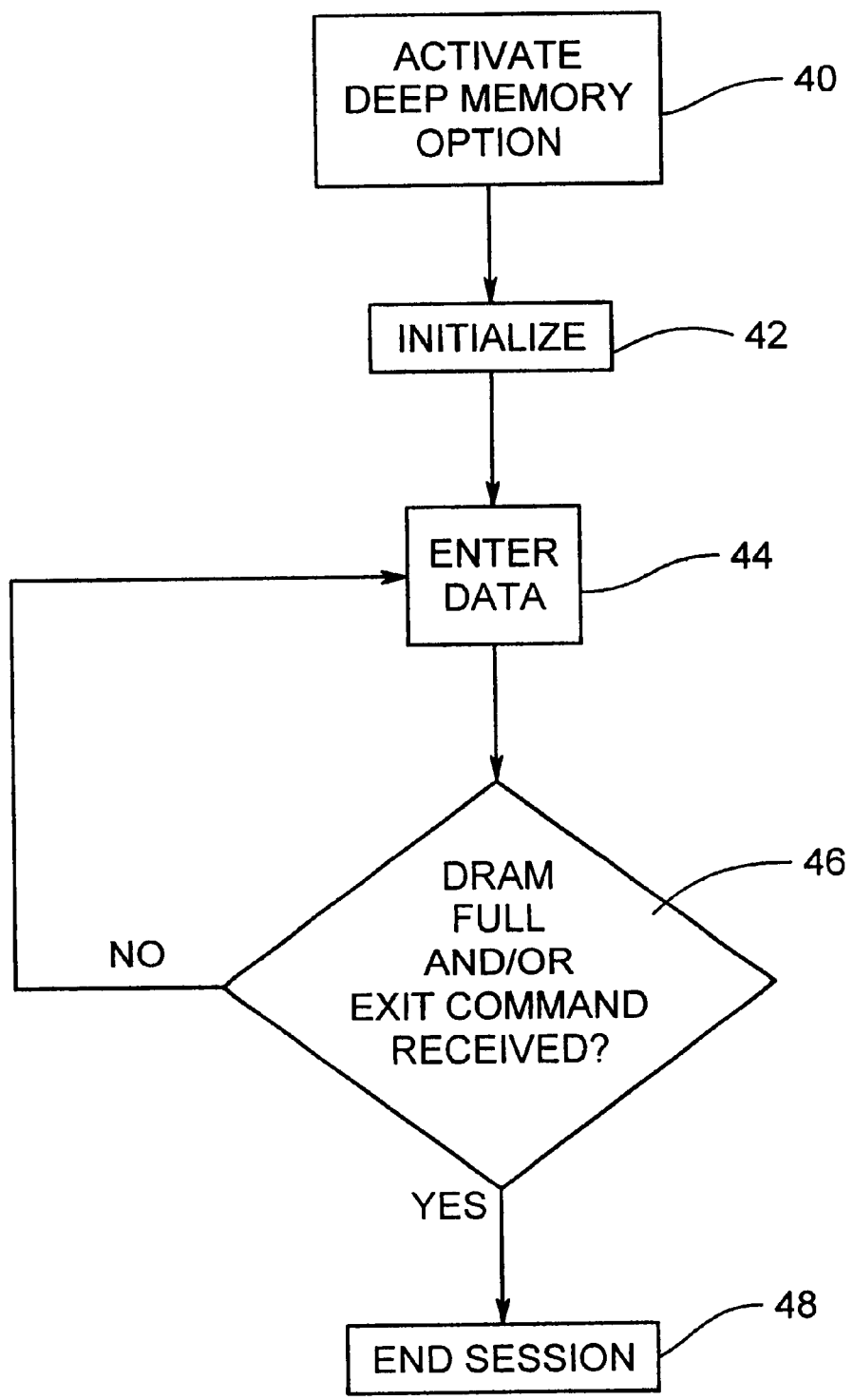
FIG. 5 is a logic block diagram depicting data storing process implemented in the preferred embodiment of the present invention.
Figure 6:
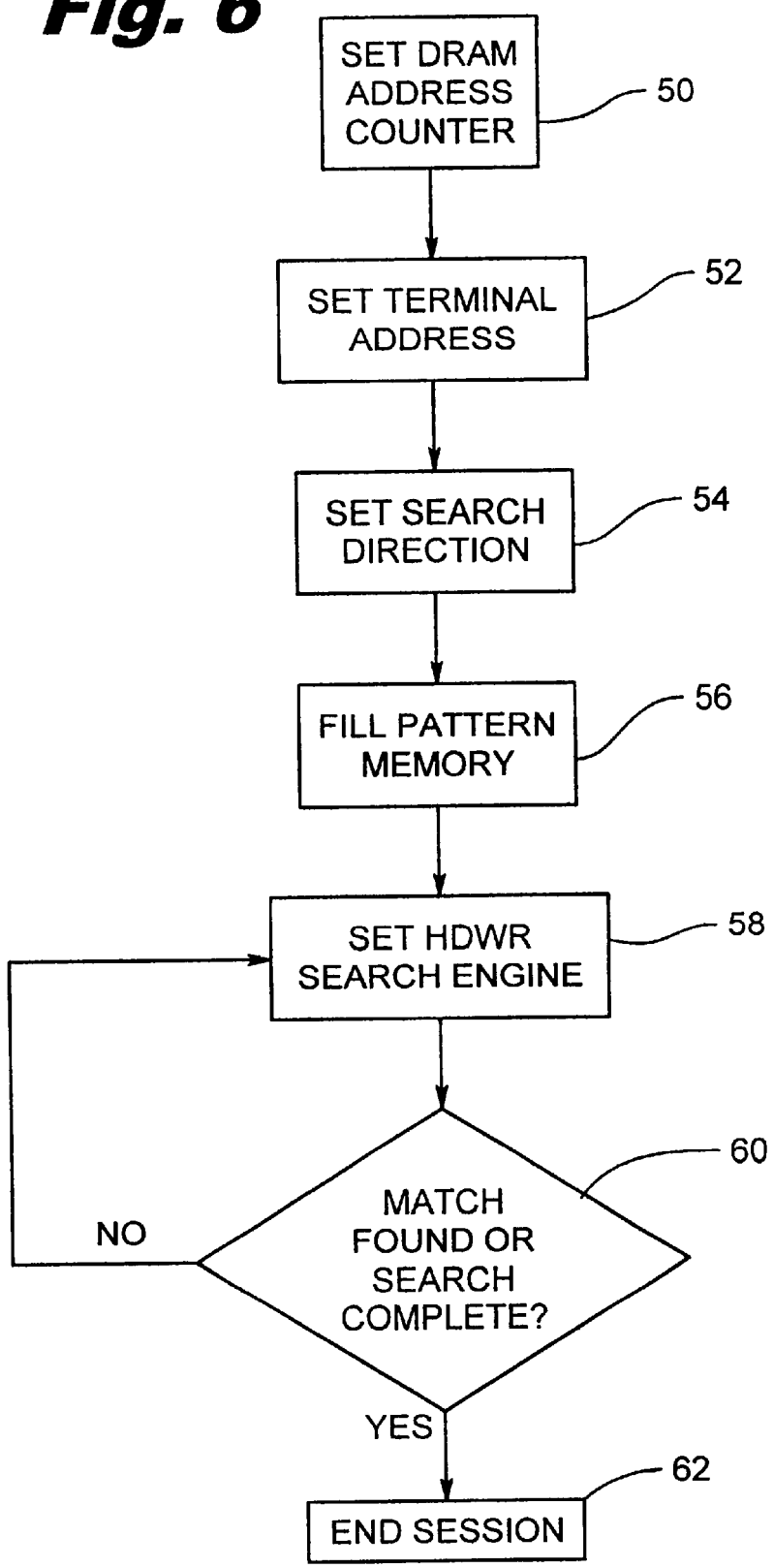
FIG. 6 is a logic block diagram depicting a searching process implemented in the preferred embodiment of the present invention.
Figure 7:
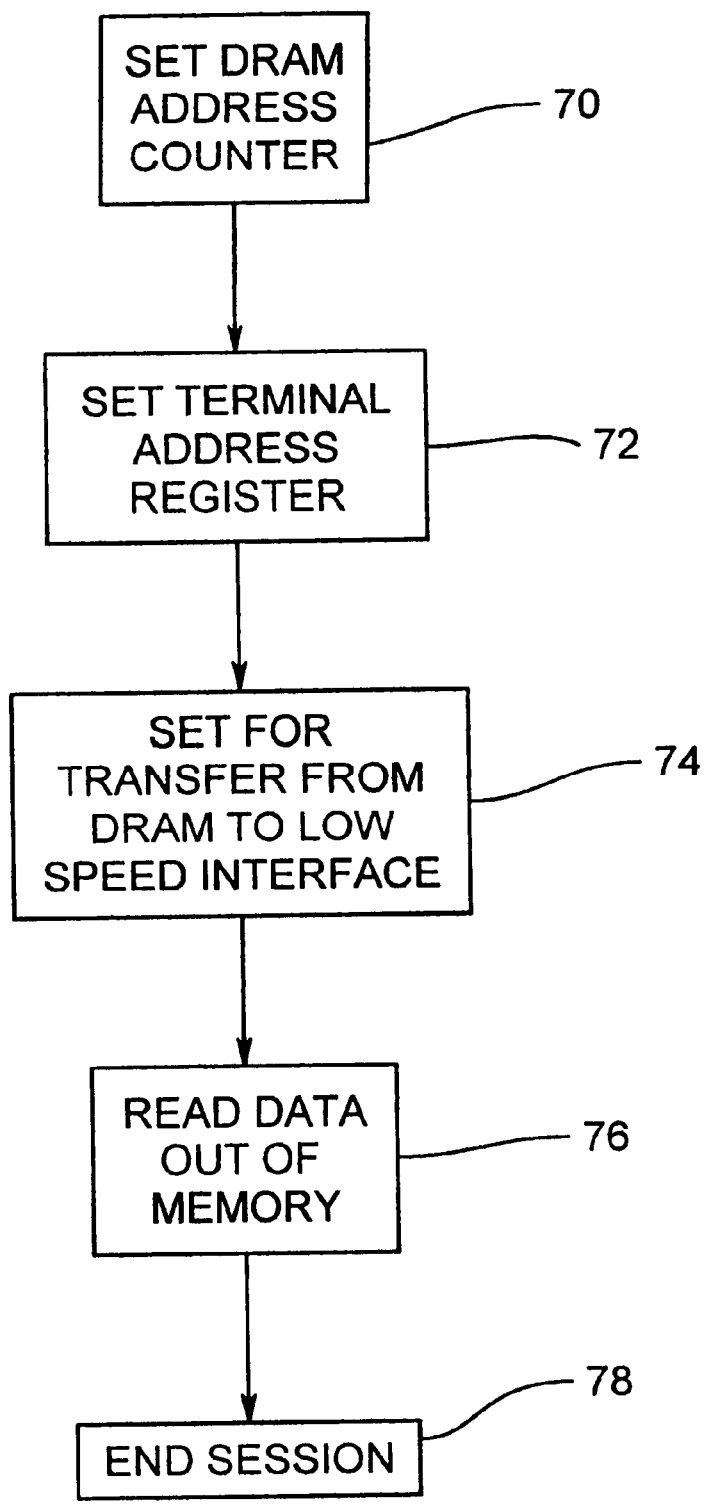
FIG. 7 is a logic block diagram showing data transfer process implemented in the preferred embodiment of the present invention.

Referring now to FIG. 5, a data storing process logic chart is shown. The chart depicts high level sequential logic steps necessary to effect data storing process. Similarly, FIG. 6 shows a searching process logic chart. The chart depicts high level sequential logic steps implemented to read DRAM address counter to get location in DRAM. Further, FIG. 7 is a logic chart showing a data transfer process as implemented in a unidirectional data transfer logic sequence.

Referring now to FIG. 1 and FIG. 5 in more detail, deep memory option is triggered under logic step 40 to store data into trace memory. In operation, 36 bit data is received from the interface port 10 and passed through dual port memory 12 which is preferably a 16 deep dual port memory configured as a fifo. The deep memory option is initialized under logic step 42. Subsequently, data is entered under logic step 44. The data is stored in DRAM under decision block 46. If DRAM is full and/or an exit command is received, the session is terminated under logic step 48. In the alternate, if DRAM is not full and/or there is no exit command, the logic reverts back to logic step 44 to enter more data as apparent. Storing data into trace memory involves the cooperative elements of FIG. 1. Specifically, when data is entered in dual port memory 12, DRAM address counter 18 addresses 's DRAM. In a preferred operational sequence, DRAM address counter will start at address zero and an increment each time a 36 bit word is stored into each DRAM bank 14 and DRAM bank 16. Thus, in data storing process (See FIG. 5) DRAM bank 14 operates one cycle later than DRAM bank 16. Accordingly, for every write access to DRAM bank 14, there will be a corresponding access to DRAM bank 16. Further, DRAM address counter 18 is compared to user initiable terminal address register. When the two are equal, trace memory is full. This is similar to the condition depicted under decision logic step 46 wherein when DRAM is full, the session is terminated in accordance with logic step 48. In the alternate, based on user option, the analyzer may stop or start over-writing trace memory.

Dual port memory 12 preferably configured as a fifo is one of the essential components of the present invention. Specifically the unit plays an important role when an overwrite condition prevails in the analyzer. Under this scenario, the last three words received from the analyzer must be overwritten by the next three words from the analyzer. A 4 bit write pointer selects which address to store data in. It starts at zero and counts up with each data word stored.

When an overwrite occurs, the write pointer is decremented by three. A 4 bit read pointer is used to address the location of the next valid data word to be read out of the dual port fifo. The read pointer starts at address zero and increments each time a word is read out of the dual port fifo. Finally, a 4 bit full counter exists that indicates how much data is in the dual port fifo. The full counter increments on a write, decrements on a read, and decrements by 3 on an overwrite. Data is not allowed to be read out of the dual port fifo until 8 or more words are in the fifo. This ensures that at least 2 words are available to be written into DRAM bank 14 and DRAM bank 16, and that there is no chance of an overwrite occurring with this data.

Referring now to FIG. 6 in more detail, the searching process includes initiating the DRAM address counter 18 under logic step 50. Subsequently, the logic proceeds to set terminal address under logic step 52 to ending address of search. The search direction is set under logic step 54. Thereafter, the logic proceeds to fill pattern memory with preferably 16 desired data words and 16 don't care words under logic step 56. At the termination of filling, pattern memory, the logic proceeds to implement hardware search engine under logic step 58. The search engine is operated until a match is found or search is terminated under decision block 60. If a match is found DRAM address counter 18 is read to get the location in DRAM and the search ends under logic step 62. In the alternate, in the event a match is not found and/or the search terminated, the logic enters a subroutine in which the hardware search engine is set to look for a match or search complete signal/command.

Now turning to FIG. 3 in view of the discussion hereinabove, pertaining to FIG. 6, it will be observed that search engine 30 is in data communication with DRAM bank 14 and DRAM bank 16. Further, in accordance with FIG. 3, DRAM bank 14 operates 2 cycles (40 ns) later than DRAM bank 16. For every read access from DRAM bank 16 there will be a corresponding access from DRAM bank 14. The DRAM address counter 18 is initialized by the user to point to the first address in DRAM of the data to be searched. The terminal address register is initialized by the user to point to the last address in DRAM to be searched. Once hardware search is set under logic step 58, data is read out of the DRAM and fed into search engine 30. DRAM address counter 18 increments after each dual access to DRAM, and the hardware will continue reading data out of DRAM until the search is complete (address counter equals terminal address register) or until a match is found in accordance with decision block 60. (When halted by a match, the user can read the address pointer to find out where the match is located.)

As discussed hereinabove, the search engine consists of preferably two blocks of RAM, each 36 bits wide by 16 deep, a 4 bit counter, and comparator 36. Referring now to FIG. 4, it is shown that the desired search pattern is written into one block of Pattern RAM 32 by the user, and don't care bits are written to the other Pattern RAM 32. Pattern RAM 32 holds the desired data and the don't cares of the search pattern. Thus the user has the ability to specify hi, low, or don't care for each bit of 16 sequential 36 bit words as the pattern to search for.

After the pattern RAM is initialized and the DRAM address pointer and terminal address registers are set, the hardware search process depicted in logic chart of FIG. 6 can be initiated for operation. At this point address counter for Pattern RAM 32 is zero, and the data out of Pattern RAM 32 is the desired data for the first word of the search pattern. A 36 bits of data from the DRAM, 36 bits of desired data from the pattern RAM 32, and 36 don't care bits from Pattern RAM 32 all go into the comparator 36 which generates a match signal. If a match occurs, the address counter of Pattern RAM 32 increments and the next word from DRAM is compared to the second word of the desired search pattern. If no match is found, the address counter of Pattern RAM 32 is cleared to zero, and the search starts all over again. If the address counter of Pattern RAM 32 reaches terminal count (15+ count up) a complete match has been found. When this condition is indicated or confirmed, the reading of DRAM is halted, and the user can find the location of the match in DRAM by reading DRAM address counter 18.

Referring now to FIG. 7, a logic chart depicting a data transfer process is shown. Specifically, the transfer process is initiated under logic step 70 by setting DRAM address counter 18 to starting address of data transfer. Subsequently, terminal address register is set to ending address data transfer under logic step 72. Thereafter, the logic proceeds to set for data transfer from DRAM to low speed host processor port 28 under logic step 74. Preferably, the low speed host processor port is internally connected to a 16 bit bus interface connection that provides connection between the protocol analyzer and deep memory trace board. As will be appreciated by those of skill in the art, the bus interface connection internal to the protocol analyzer advantageously operates very much like the PC ISA bus. Further, the data is read out of the deep trace memory under logic step 76 and subsequently the session is terminated under logic step 78.

The transfer of data from DRAM to the low speed terminal involves the cooperative operation of software logic as shown in FIG. 7 and hardware as shown in FIG. 2. Specifically, DRAM bank 14 operates 2 cycles (40 ns) later than DRAM bank 16. Thus, for every read access from bank 16 there will be a corresponding access from bank 14. The address counter is initialized by the user to point to the first address in DRAM of the data to be transferred. The terminal address register is initialized by the user to point to the last address in DRAM to be transferred. Once the data transfer on process is activated, data is read out of the DRAM and stored in a 36 bit register. Only one 36 bit word of the dual bank access is used, the other word is discarded. A second dual bank access is done when the next 36 bits of data is needed.

Once the data is in the 36 bit register, it is multiplexed onto the 16 bit low speed interface. When the user reads the data port, he will first get bits 35-32 of the first 36 bit word, followed by bits 31-16, and finally bits 15-0. Once bits 15-0 have been transferred, more data is read out of DRAM and moved into the 36 bit register. The address counter increments after every other read access of DRAM, and when the address counter equals the terminal address register, the data transfer is exited.

Accordingly the present invention provides a modular and expandable trace memory depth which advantageously implements a hardware search engine complementary with software for storing, data, transferring data and quickly find a desired data pattern. Specifically, the present invention discloses heretofore unknown apparatus and method in which a hardware search engine in cooperation with trace memory hardware, a low speed interface and DRAM banks and software implemented therein enable trace memory modular expansion.

Although the invention hereof has been described by way of example of a preferred embodiment, it will be evident that other adaptations and modifications may be employed without departing from the spirit and scope thereof. For example, other types of trace memory may be modularly structured for expansion.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A protocol analyzer having a deep trace memory system that stores traces captured from a communication interface for presentation by a host processor, the protocol analyzer comprising:
   a portable chassis physically separate from the host processor that includes:
      a host port that provides a connection to the host processor;
      an interface port that provides a connection to the communication interface;
      a trace buffer memory;
      logic circuitry that controls selective write operations of traces from the interface port to the trace buffer and selective read operations of traces from the trace buffer to the host port in response to parameters directed by the host processor; and
      a hardware search engine that locates specified data patterns as directed by the host processor within the trace buffer.

2. The protocol analyzer of claim 1 wherein the communication interface is a Fibre Channel interface having a serial transfer rate of at least 1 gigabit/second.

3. The protocol analyzer of claim 1 wherein the host port is a PC parallel port.

4. The protocol analyzer of claim 1 wherein the interface port provides a pair of channel connections to the communication interface and the trace buffer is divided into dual channels, one channel that stores traces from a first channel connection and another channel that stores traces from a second channel connection.

5. The protocol analyzer of claim 1 wherein the hardware search engine searches the entire contents of the trace buffer for a specified data pattern in less than 10 seconds.

6. The protocol analyzer of claim 1 wherein the portable chassis is less than 750 cubic inches and weighs less than 10 pounds.

7. The protocol analyzer of claim 1 wherein hardware search engine searches the contents of the trace buffer at a speed of greater than 1 Mbyte every 20 milliseconds.

8. The protocol analyzer of claim 1 wherein the trace buffer comprises at least two interleaved banks of memory formed of at least two megabytes of dynamic random access memory (DRAM) chips and wherein the traces are stored in each bank of the trace buffer on alternating clock cycles such that the DRAM chips are refreshed on the opposite alternating clock cycles.

9. The protocol analyzer of claim 1 wherein the logic circuitry includes:
   a dual port memory connected the interface port and the trace buffer to serve as a first-in, first out (fifo) buffer;
   addressing circuitry connected to the dual port memory and the trace buffer having a write address counter, a read address counter and an address full counter; and
   decision circuitry connected to the addressing circuitry and the dual port memory to analyze data in the fifo buffer and determine whether the data in the fifo buffer is a trace to be stored in the trace buffer.

10. The protocol analyzer of claim 1 wherein the hardware search engine comprises:
   a pattern memory loaded with a desired data pattern;
   an address counter containing an address in the trace buffer to initiate; and a comparator connected to the pattern memory and the trace buffer.

11. A system for analyzing a communication interface comprising:
- a host processor that includes:
  - a user interface;
  - a computer processor; and
  - a main memory;
- a protocol analyzer distinct from the host processor that includes:
  - a host port that provides a connection to the host processor;
  - an interface port that provides a connection to the communication interface;
  - a trace buffer memory;
  - logic circuitry that controls selective write operations of traces from the interface port to the trace buffer and selective read operations of traces from the trace buffer to the host port in response to parameters as directed by the host processor; and
  - a hardware search engine that locates specified data patterns as directed by the host processor within the trace buffer.

12. The system of claim 11 wherein the communication interface is a Fibre Channel interface having a serial transfer rate of at least 1 gigabit/second.

13. The system of claim 11 wherein the host processor is a laptop computer and the protocol analyzer is housed in a portable chassis separate from the laptop computer and the host port is a PC parallel port.

14. The system of claim 11 wherein the host port provides a bus interface between the protocol analyzer and the host processor separate from an interface between the trace buffer and the hardware search engine of the protocol analyzer and separate from a bus interface between computer processor and memory of the host processor.

15. The system of claim 11 wherein the interface port provides a pair of channel connections to the communication interface and the trace buffer is divided into dual channels, one channel that stores traces from a first channel connection and another channel that stores traces from a second channel connection.

16. The system of claim 11 wherein the hardware search engine searches the entire contents of the trace buffer for a specified data pattern in less than 10 seconds.

17. The system of claim 11 wherein the hardware search engine searches the contents of the trace buffer at a speed of greater than 1 Mbyte every 20 milliseconds.

18. The system of claim 11 wherein the trace buffer comprises at least two interleaved banks of memory formed of at least two megabytes of dynamic random access memory (DRAM) chips and wherein the traces are stored in each bank of the trace buffer on alternating clock cycles such that the DRAM chips are refreshed on the opposite alternating clock cycles.

19. The system of claim 11 wherein the logic circuitry includes:
- a dual port memory connected the interface port and the trace buffer to serve as a first-in, first out (fifo) buffer;
- addressing circuitry connected to the dual port memory and the trace buffer having a write address counter, a read address counter and an address full counter; and
- decision circuitry connected to the addressing circuitry and the dual port memory to analyze data in the fifo buffer and determine whether the data in the fifo buffer is a trace to be stored in the trace buffer.

20. The system of claim 11 wherein the hardware search engine comprises:
- a pattern memory loaded with a desired data pattern;
- an address counter containing an address in the trace buffer to initiate; and
- a comparator connected to the pattern memory and the trace buffer.

21. A method of managing memory of a deep trace buffer of a protocol analyzer for a communication interface comprising:
- (a) selectively writing traces from the communication interface into the trace buffer of the protocol analyzer;
- (b) using a hardware search engine in the protocol analyzer to identify portions of the traces in the trace buffer matching a specified data pattern as determined by a host processor having a computer processor and a main memory separate from the trace buffer of the protocol analyzer; and
- (c) in response to step (b), selectively reading at least a portion of the traces from the buffer to the host processor.

* * * * *

(12) EX PARTE REEXAMINATION CERTIFICATE (5124th)
United States Patent
Bucher et al.

(10) Number: US 6,266,789 C1
(45) Certificate Issued: Jun. 21, 2005

(54) DEEP TRACE MEMORY SYSTEM FOR A PROTOCOL ANALYZER

(75) Inventors: Steven Bucher, Minnetonka, MN (US); Daniel G. Kuechle, Ramsey, MN (US); Timothy A. Wall, Big Lake, MN (US)

(73) Assignee: I-Tech Corp., Eden Prairie, MN (US)

Reexamination Request:
No. 90/007,002, Apr. 8, 2004

Reexamination Certificate for:
Patent No.: 6,266,789
Issued: Jul. 24, 2001
Appl. No.: 09/193,779
Filed: Nov. 17, 1998

Related U.S. Application Data

(60) Provisional application No. 60/065,782, filed on Nov. 17, 1997.

(51) Int. Cl.$^7$ ................................................. G06F 11/25
(52) U.S. Cl. ............................... 714/39; 714/45; 707/6
(58) Field of Search ............................... 714/39, 45, 6, 714/43, 46, 37, 34, 35

(56) References Cited

U.S. PATENT DOCUMENTS

| | | |
|---|---|---|
| 3,344,408 A | 9/1967 | Singer et al. |
| 3,390,380 A | 6/1968 | Cooke-Yarborough et al. |
| 3,540,003 A | 11/1970 | Murphy |
| 3,748,650 A | 7/1973 | Garcia et al. |
| 3,831,149 A | 8/1974 | Job |
| 3,916,123 A | 10/1975 | Werner et al. |
| 3,931,612 A | 1/1976 | Stevens et al. |
| 3,942,152 A | 3/1976 | Pettersson |
| 4,022,978 A | 5/1977 | Connell et al. |
| 4,044,336 A | 8/1977 | Babb |
| 4,052,719 A | 10/1977 | Hutt et al. |
| 4,166,290 A | 8/1979 | Furtman et al. |
| 4,241,402 A | 12/1980 | Mayper, Jr. et al. |
| 4,241,416 A | 12/1980 | Tarczy-Hornoch |
| 4,283,771 A | 8/1981 | Chang |
| 4,303,941 A | 12/1981 | Marti et al. |
| 4,450,520 A | 5/1984 | Hollaar et al. |
| 4,550,407 A | 10/1985 | Couasnon et al. |
| 4,628,511 A | 12/1986 | Stitzlein et al. |
| 4,636,941 A | 1/1987 | Suko |
| 4,639,915 A | 1/1987 | Bosse |
| 4,760,523 A | 7/1988 | Yu et al. ..................... 364/200 |
| 4,773,003 A | 9/1988 | Hauge |
| 4,906,991 A | 3/1990 | Fiala et al. |
| 4,949,252 A | 8/1990 | Hauge |
| 5,047,930 A | 9/1991 | Martens et al. |
| 5,051,947 A | 9/1991 | Messenger et al. |
| 5,058,144 A | 10/1991 | Fiala et al. |
| 5,175,860 A | 12/1992 | Yamada |
| 5,194,325 A | 3/1993 | Jones |

(Continued)

OTHER PUBLICATIONS

*An FPGA Implementation of ATR Using Embedded RAM for Control*, R. D. Ross, Thesis, 128 pgs.; Jun. 30, 1997.
*Reconfigurable Computing Application Frameworks*, A.L. Slade, B.E. Nelson, B.L. Hutchings, Brigham Young University, Provo, Utah, 10 pgs.; not dated.
*EDN Access For Design, by Design*, EDN Magazine, 12 pgs., Apr. 10, 1997.

(Continued)

*Primary Examiner*—Nadeem Iqbal

(57) ABSTRACT

A deep trace buffer management system for a protocol analyzer includes a hardware search engine that locates specified data patterns within the trace buffer as directed by a host processor. The protocol analyzer is preferably connected to a laptop computer that serves as the host processor, and the protocol analyzer preferably is housed in a portable chassis separate from the host processor and has a host port to connect to the host processor through a relatively small bandwidth port. An interface port connects the protocol analyzer to the communication interface under analysis. Logic circuitry controls selective read and write operations of traces to and from the trace buffer in response to parameters as directed by the host processor.

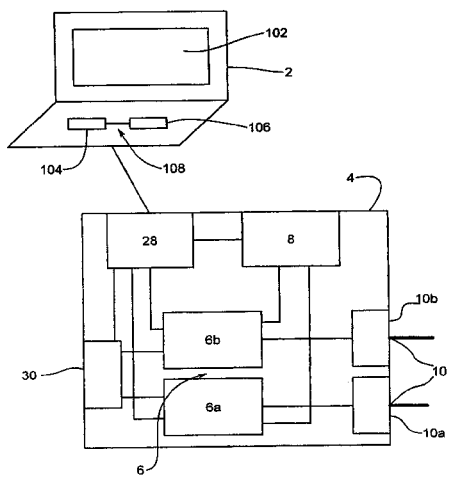

U.S. PATENT DOCUMENTS

| Patent No. | Date | Inventor |
|---|---|---|
| 5,249,292 A | 9/1993 | Chiappa |
| 5,289,584 A | 2/1994 | Thome et al. |
| 5,299,118 A | 3/1994 | Martens et al. |
| 5,299,206 A | 3/1994 | Beaverson et al. |
| 5,304,990 A | 4/1994 | Rebourg et al. |
| 5,321,843 A | 6/1994 | Shoji et al. |
| 5,347,524 A | 9/1994 | I'Anson et al. |
| 5,355,528 A | 10/1994 | Roska et al. |
| 5,377,344 A | 12/1994 | Stager et al. |
| 5,388,234 A | 2/1995 | Kanno et al. |
| 5,400,331 A | 3/1995 | Lucak et al. |
| 5,404,504 A | 4/1995 | Byers et al. |
| 5,414,704 A | 5/1995 | Spinney et al. |
| 5,434,845 A | 7/1995 | Miller |
| 5,442,639 A | 8/1995 | Crowder et al. |
| 5,454,096 A | 9/1995 | Otsuka et al. |
| 5,457,694 A | 10/1995 | Smith |
| 5,548,719 A | 8/1996 | DeVane et al. |
| 5,563,828 A | 10/1996 | Hasbun et al. |
| 5,574,396 A | 11/1996 | Drainville |
| 5,574,936 A | 11/1996 | Ryba et al. |
| 5,586,288 A | 12/1996 | Dahlberg |
| 5,588,115 A | 12/1996 | Augarten |
| 5,671,376 A | 9/1997 | Bucher et al. |
| 5,684,954 A | 11/1997 | Kaiserswerth et al. |
| 5,689,515 A | 11/1997 | Panis |
| 5,715,409 A | 2/1998 | Bucher et al. |
| 5,717,834 A | 2/1998 | Werblin et al. |
| 5,737,520 A | 4/1998 | Gronlund et al. |
| 5,784,298 A | 7/1998 | Hershey et al. |
| 5,787,253 A | 7/1998 | McCreery et al. |
| 5,787,430 A | 7/1998 | Doeringer et al. |
| 5,790,559 A | 8/1998 | Sato |
| 5,796,944 A | 8/1998 | Hill et al. |
| 5,802,290 A | 9/1998 | Casselman |
| 5,813,040 A | 9/1998 | Rathke |
| 5,889,985 A | 3/1999 | Babaian et al. |
| 5,892,962 A | 4/1999 | Cloutier |
| 5,923,871 A | 7/1999 | Gorshtein et al. |
| 5,930,344 A | 7/1999 | Relyea et al. |
| 5,938,780 A | 8/1999 | Panis |
| 5,983,336 A | 11/1999 | Sakhin et al. |
| 6,044,087 A | 3/2000 | Muller et al. |
| 6,049,362 A | 4/2000 | Butter et al. |
| 6,061,511 A | 5/2000 | Marantz et al. |
| 6,070,078 A | 5/2000 | Camp, Jr. et al. |
| 6,115,378 A | 9/2000 | Hendel et al. |
| 6,118,760 A | 9/2000 | Zaumen et al. |
| 6,154,603 A | 11/2000 | Willis et al. |
| 6,208,959 B1 | 3/2001 | Jonsson et al. |
| 6,222,979 B1 | 4/2001 | Willis et al. |
| 6,229,951 B1 | 5/2001 | Schultz et al. |
| 6,259,699 B1 | 7/2001 | Opalka et al. |
| 6,266,336 B1 | 7/2001 | Siegel et al. |
| 6,266,789 B1 | 7/2001 | Bucher et al. |
| 6,301,671 B1 | 10/2001 | Boice et al. |
| 6,304,903 B1 | 10/2001 | Ward |
| 6,320,826 B1 | 11/2001 | Willis et al. |
| 6,331,998 B1 | 12/2001 | Lin et al. |
| 6,370,622 B1 | 4/2002 | Chiou et al. |
| 6,377,748 B1 | 4/2002 | Schultz et al. |
| 6,393,587 B2 | 5/2002 | Bucher et al. |
| 6,430,527 B1 | 8/2002 | Waters et al. |
| 6,453,114 B2 | 9/2002 | Schultz et al. |
| 6,463,067 B1 | 10/2002 | Hebb et al. |
| 6,463,209 B2 | 10/2002 | Schultz et al. |
| 6,516,462 B1 | 2/2003 | Okunev et al. |
| 6,522,632 B1 | 2/2003 | Waters et al. |

OTHER PUBLICATIONS

*Extension of Digital Test System Data Rates to the Gigabit Per Second Range*, R. J. Wenzel, D.C. Keezer, Center for Microelectronics Research, Dept. of Electrical Engineering, University of South Florida, IEEE, pp. 333–336; 1993.

*Improving Design Observability and Controllability for Functional Verification of FPGA–Based Circuits Using Design–Level Scan Techniques*, T.B. Wheeler, Thesis, 80 pgs.; Feb. 2001.

*Using Design–Level Scan to Improve FPGA Design Observability and Controllability for Functional Verification*, T.B. Wheeler, P. Graham, B. Nelson, B. Hutchings, Dept. of Electrical and Computer Engineering, Brigham Young University, Provo, Utah, 10 pgs., not dated.

*DISC: The Dynamic Instruction Set Computer*, M.J. Wirthlin, B.L. Hutchings, Dept. of Electrical and Computer Engineering, Brigham Young University, Provo, Utah, 12 pgs., not dated.

*Improving Functional Density Through Run–Time Circuit Reconfiguration*, M. J. Wirthlin, Thesis, 233 pgs., Nov. 1997.

*Improving Functional Density Through Run–time Constant Propogation*, M.J. Wirthlin, B.L. Hutchings, Dept. of Electrical and Computer Engineering, Brigham Young University, Provo, Utah, 7 pgs., not dated.

*The Nano Processor: a Low Resource Reconfigurable Processor*, M.J. Wirthlin, B.L. Hutchings, K.L. Gilson, Dept. of Electrical and Computer Engineering, Brigham Young University, Provo, Utah, National Technology Inc., Sandy, Utah, 9 pgs., Apr. 11, 1994.

*Implementation Approaches for Reconfigurable Logic Applications*, B.L. Hutchings, M. J. Wirthlin, Dept. of Electrical and Computer Engineering, Brigham Young University, Provo, Utah, 11 pgs., not dated.

*Analysis is Key to PCI–X Operation*, T. Nygaar, Planet Analog—Instant Access to System Solutions, 3 pgs.; May 22, 2000.

*Supporting FPGA Microprocessors Through Retargetable Software Tools*, D.A. Clark, Dept. of Electrical and Computer Engineering, Brigham Young University, Provo, Utah, 1 pg., Apr. 1996.

*A Dynamic Instruction Set Computer*, M.J. Wirthlin, B.L. Hutchings, Dept. of Electrical and Computer Engineering, Brigham Young University, Provo, Utah, 1 pg.; not dated.

*An Assessment of the Suitability of Reconfigurable Systems for Digital Signal Processing*, R.J. Petersen, Dept. of Electrical and Computer Engineering, Brigham Young University, Provo, Utah, 1 pg., Sep. 27, 1995.

*Frequency–Domain Sonar Processing in FPGAs and DSPs*, P. Graham, B. Nelson, Brigham Young University, Provo, Utah, 2 pgs., not dated.

*IBM PowerNP Network Processor: Hardware, Software and Applications*, J.R. Allen, Jr., B.M. Bass, C. Basso, R.H. Boivie, J.L. Calvignac, G.T. Davis, L. Frelechoux, M. Heddes, A. Herkersdorf, A. Kinds, J.F. Logan, M. Peyravian, M.A. Rinaldi, R.K. Sabhiki, M.S. Siegel, M. Waldvogel, IBM Journal of Research & Development, vol. 47, No. 2/3, pp. 177–193; Mar./May 2003.

*Logical Hardware Debuggers for FPGA–Based Systems*, P.S. Graham, Dissertation, Dept. of Electrical and Computer Engineering, Brigham Young University, Provo, Utah, 266 pgs.; Dec. 2001.

*Automated Target Recognition of SPLASH 2*, M. Rencher, B.L. Hutchings, Dept. of Electrical and Computer Engineering, Brigham Young University, Provo, Utah, 2 pgs.; not dated.

*Special–Purpose Hardware for Information Retrieval*, L. A. Hollaar, Dept. of Computer Science, University of Utah, pp. 443–458, not dated.

*Designing, Debugging, and Deploying Configurable Computing Machine–Based Applications Using Reconfigurable Computing Application Frameworks*, A.L. Slade, Thesis, Dept. of Electrical and Computer Engineering, Brigham Young University, Provo, Utah, 246 pgs.; Apr. 2003.

*Hardware for Searching Very Large Text Databases*, R.L. Haskin, Thesis, University of Illinois, Urbana, Illinois, 157 pgs.; Aug. 1980.

*Realization of a PFSA Based Search Machine*, J. Schimpf, Thesis, Dept. of Computer Science, University of Utah, 38 pgs.; Jun. 1987.

*Current Research Into Specialized Processors for Text Information Retrieval*, L.A. Hollaar, Dept. of Computer Science, University of Illinois; D.C. Roberts, Central Intelligence Agency, Washington, D.C.; 10 pgs.; not dated.

*Hardware Systems for Text Information Retrieval*, L.A. Hollaar, Dept. of Computer Science, University of Utah, 7 pgs.; not dated.

*Operational Characteristics of a Hardware–Based Pattern Matcher*, R.L. Haskin, L.A. Hollaar, ACM Transactions on Database Systems, vol. 8, No. 1, pp. 15–40, Mar. 1983.

*Rotating Memory Processors for the Matching of Complex Textual Patterns*, L.A. Hollaar, The 5th Annual Symposium on Computer Architecture, pp. 39–43, Apr. 3–5, 1978.

*The Utah Search Engine*, L.A. Hollaar, Dept. of Computer Science, University of Utah, 1 pg., not dated.

*The Utah Text Search Engine: Implementation Experiences and Future Plans*, L.A. Hollaar, 4th International Workshop on Database Machines, 10 pgs., Mar. 6–8, 1985.

*Special Purpose Hardware for Text Searching: Past Experience, Future Potential*, L.A. Hollaar, Information Processing & Management, vol. 27, No. 4, pp. 371–378, 1991.

*E5200A Broadband Service Analyzer*, Product Release Notice: Release 1.60, Hewlett–Packard Company, 11 pgs., Dec. 10, 1996.

*Link Analyzer Sleuths Out Net Problems*, S. Runyon, Electronic Engineering Times, Issue 910, 2 pgs.; Jul. 1996.

*The Future of the Internet: Good News for Semiconductor Manufacturers*, Hewlett–Packard, go/semiconductor—ideas and information for Test Engineers and Managers, vol. 1., No. 2, 12 pgs.; Autumn 1997.

*Terabit–per–second Automated Digital Testing*, D.C. Keezer, Q. Zhou, C. Bair, J. Kuan, B. Poole, ITC International Test Conference, Paper No. 41.3, pp. 1143–1150, 2001.

*Real–Time Data Comparison for Gigahertz Digital Test*, D.C. Keezer, ITC International Test Conference, Paper No. 29.2, pp. 790–797, 1991.

*Low Cost ATE Pin Electronics for Multigigabit–per–Second At–Speed Test*, D.C. Keezer, R.J. Wenzel, ITC International Test Conference, 7 pgs.; 1997.

Brochure: *RaSer: Cell Features*, A. Godbole, Rambus®Developer Forum, 31 pgs., Oct. 23, 2001.

*Flexible Processors: A promising application–specific processor design approach*, A. Wolfe, J.P. Shen, IEEE, pp. 30–39, 1988.

Press Release: *Teradyne Introduces Hardware Option for Testing PRML and LAN Devices*, Teradyne Inc., 2 pgs., Nov. 3, 1997.

Brochure: *T5371 Memory Test System*, Advantest®, Advantest America, Inc., 2 pgs.; Jul. 1999.

*ATFab*, Hewlett Packard 83000 Digital VLSI Test System, Bid & Brokerage, Inc., Phoenix, Arizona, 7 pgs.; not dated.

*Multiplexing Test System Channels for Data Rates Above 1 Gb/s*, D.C. Keezer, ITC International Test Conference, Paper No. 18.3, pp. 362–368, 1990.

*A Simple Algorithm for Nearest Neighbor Search in High Dimensions*, S.A. Nene, S.K. Nayar, IEEE Transactions on Pattern Analysis and Machine Intelligence, vol. 19, No. 9, pp. 989–1003, Sep. 1997.

*Information Technology—SCSI Parallel Interface–2 (SPI–2)*, Working Draft American National Standard, G.O. Penokie, 215 pgs.; Jul. 22, 1998.

*$ADir_pNB$: A Cost–Effective Way to Implement Full Map Directory–Based Cache Coherence Protocols*, T. Li, L.K. John, IEEE Transactions on Computers, vol. 50, No. 9, pp. 921–934, Sep. 2001.

*High Performance Analysis and Control of Complex Systems Using Dynamically Reconfigurable Silicon and Optical Fiber Memory*, L.F. Wood, pp. 132–141, not dated.

*Real–time String Search Engine LSI for 800–Mbit–sec LANs*, H. Yamada, Y. Murata, T. Maeda, R. Ikeda, K. Motohashi, K. Takahashi, IEEE Custom Integrated Circuits Conference, 4 pgs.; 1988.

*Computer Organization, 3rd Edition*, V.C. Hamacher, Z.G. Vranesic, S.G. Zaky, p. 335, not dated.

*Optimal Finite Field Multipliers for FPGAs*, G.C. Ahlquist, B. Nelson, M. Rice, Brigham Young University, Provo, Utah, 10 pgs., not dated.

*Supporting FPGA Microprocessors through Retargetable Software Tools*, D.A. Clark, B.L. Hutchings, Dept. of Electrical and Computer Engineering, Brigham Young University, Provo, Utah, 9 pgs., not dated.

*FPGA–Based Stochastic Neural Networks—Implementation*, S.L. Bade, B.L. Hutchings, Dept. of Electrical and Computer Engineering, Brigham Young University, Provo, Utah, 11 pgs., Apr. 12, 1994.

Reviews: *Network Protocol Analyzers: A Window to the WAN*, W.C. Baird, 5 pgs., not dated.

*JHDL—An HDL for Reconfigurable Systems*, P. Bellows, B.L. Hutchings, Dept. of Electrical and Computer Engineering, Brigham Young University, Provo, Utah, 10 pgs., not dated.

*Analysis of Field–Programmable Gate Array Implementations of Constant Coefficient Finite Impulse Response Filters*, B.L. Bullough, Thesis, Dept. of Electrical and Computer Engineering, Brigham Young University, Provo, Utah, 70 pgs., Aug. 2002.

*Density Enhancement of a Neural Network Using FPGAs and Run–Time Reconfiguration*, J.G. Eldredge, B.L. Hutchings, Dept. of Electrical and Computer Engineering, Brigham Young University, Provo, Utah, pp. 180–188, IEEE 1994.

*Run–time Reconfiguration: A Method for Enhancing the Functional Density of SRAM–based FPGAs*, J.G. Eldredge, B.L. Hutchings, Kluwer Academic Publishers, Boston, Massachesetts, pp. 1–17; not dated.

*RRANN: The Run–Time Reconfiguration Artificial Neural Network*, J.G. Eldredge, B.L. Hutchings, IEEE Custom Integrated Circuits Conference, San Diego, California, pp. 1–5, May 2, 1994.

*Constant Coefficient Multiplication*, R.B. Fredrickson, Thesis, Dept. of Electrical and Computer Engineering, 90 pgs.; Dec. 2001.

*Reconfigurable Processors for High–Performance, Embedded Digital Signal Processing*, P. Graham, B. Nelson, Brigham Young University, Provo, Utah, 10 pgs.; not dated.

*Improving the FPGA Design Process Through Determining and Applying Logical–to–Physical Design Mappings*, P. Graham, B.L. Hutchings, B. Nelson, Dept. of Electrical and Computer Engineering, Brigham Young University, Provo, Utah, 2 pgs., not dated.

*FPGA–Based Sonar Processing*, P. Graham, B. Nelson, Dept. of Electrical and Computer Engineering, Brigham Young University, Provo, Utah, 8 pgs., not dated.

*Genetic Algorithms In Software and In Hardware—A Performance Analysis of Workstation and Custom Computing Machine Implementations*, P. Graham, B. Nelson, Dept. of Electrical and Computer Engineering, Brigham Young University, Provo, Utah, 10 pgs., not dated.

*A Hardware Genetic Algorithm for the Traveling Salesman Problem on Splash2*, P. Graham, B. Nelson, Reconfigurable Logic Laboratory, Brigham Young University, Provo, Utah, 10 pgs., not dated.

*Designing a Partially Reconfigured System*, J.D. Hadley, B.L. Hutchings, Dept. of Electrical and Computer Engineering, Brigham Young University, Provo, Utah, 11 pgs., not dated.

*The Performance Enhancement of a Run–Time Reconfigurable FPGA System Through Partial Reconfiguration*, J.D. Hadley, Thesis, Dept. of Electrical and Computer Engineering, Brigham Young University, Provo, Utah, Brigham Young University, Provo, Utah, 216 pgs.; Nov. 1995.

*Design Methodologies for Partially Reconfigured Systems*, J.D. Hadley, B.L. Hutchings, Dept. of Electrical and Computer Engineering, Brigham Young University, Provo, Utah, 7 pgs., not dated.

*A CAD Suite for High Performace FPGA Design*, B.L. Hutchings, P. Bellows, J. Hawkins, S. Hemmert, B. Nelson, M. Rytting, Dept. of Electrical and Computer Engineering, Brigham Young University, Provo, Utah, 13 pgs., not dated.

*An Application–Specific Compiler for High–Speed Binary Image Morphology*, S. Hemmert, B.L. Hutchings, A. Malvi, Brigham Young University, Provo, Utah, 11 pgs., not dated.

*An Assessment of the Suitability of FPGA–Based Systems for use in Digital Signal Processing*, R.J. Petersen, B.L. Hutchings, Dept. of Electrical and Computer Engineering, Brigham Young University, Provo, Utah, 11 pgs., not dated.

*RRANN A Hardware Implementation of the Backpropagation Algorithm Using Reconfigurable FPGAs*, J.G. Eldredge, B.L. Hutchings, Dept. of Electrical and Computer Engineering, Brigham Young University, Provo, Utah, pp. 2097–2102, not dated.

*Sequencing Run–Time Reconfigured Hardware with Software*, M.J. Wirthlin, B.L. Hutchings, Dept. of Electrical and Computer Engineering, Brigham Young University, Provo, Utah, 7 pgs., not dated.

*Using Hardware Context–Switching to Enable a Multitasking Reconfigurable Computer System*, W.J. Landaker, Dept. of Electrical and Computer Engineering, Brigham Young University, Provo, Utah, 76 pgs., Aug. 2002.

*FPGAs and DSPs for Sonar Processing—Inner Loop Computations*, P. Graham, B. Nelson, Brigham Young University, 10 pgs., not dated.

*A Comparison of FPGA Platforms Through SAR/ATR Algorithm Implementation*, M.A. Rencher, Thesis, Dept. of Electrical and Computer Engineering, Brigham Young University, Provo, Utah, 107 pgs., Dec. 1996.

*The Third–Generation HP ATM Tester*, S.W. Day, G.H. Nelson, Hewlett–Packard Journal, vol. 47, Issue 6, 7 pgs., Dec. 1996.

*HP E5200A Broadband Service Analyzer—Technical Data*, Hewlett–Packard manual, 24 pgs., May 1996.

*Prototype Analyzer Architecture*, J.E. Roeca, Hewlett–Packard Journal, vol. 47, Issue 3, 6 pgs.; Jun. 1996.

*Multiprocessor Debugging Gets Graphical*, R. Townsen, Electronic Engineering Times, Issue No. 807, 3 pgs.; Jul. 1994.

*Product File*, Electronic Engineering Times, Issue No. 783, 2 pgs.; Feb. 1994.

*E5200A Broadband Service Analyzer*, Product Release Notice: Release 1.10, Hewlett–Packard Company, 15 pgs., Jun. 26, 1996.

*E5200A Broadband Service Analyzer*, Product Release Notice: Release 1.70, Hewlett–Packard Company, 11 pgs., Mar. 4, 1997.

*Broadband Service Analysis: Copy with the network test challenge*, S. Day, Hewlett–Packard, 12 pgs.; Copyright 1996.

*Broadband Service Analyzer—User's Guide*, Hewlett–Packard, 152 pgs.; Copyright 1996.

Enger, R. , et al., "FYI on a Network Management Tool Catalog: Tools for Monitoring and Degubbing TCP/IP Internets and Interconnected Devices", http://www.rxn.com/services/rfc/rfc1470.tools.txt, (Jun. 1993),1–110.

Gogl, H. , "Selection of Equipment for Measurements in ATM Networks", *Institut fur Informatik Technische Universitat Muenchen, Germany*, (Mar. 1997),36 pages.

Meggyesi, Z. , "Fibre Channel Overview", http://hsi.web.cern.ch/HSI/fcs/spec/overview.htm, Research Institute for Particle and Nuclear Physics, Budapest, Hungary,(Aug. 15, 1994),pp. 1–10.

Murray, W. , *Computer and Digital System Architecture*, Prentice–Hall, Inc.Englewood Cliffs, NJ 07632; ISBN 0–13–165721–6,(1990),110–113.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–21 is confirmed.

\* \* \* \* \*